C. G. ETTE.
PROTECTING SLEEVE FOR POSTS AND POLES.
APPLICATION FILED MAY 4, 1908.
913,482.
Patented Feb. 23, 1909.
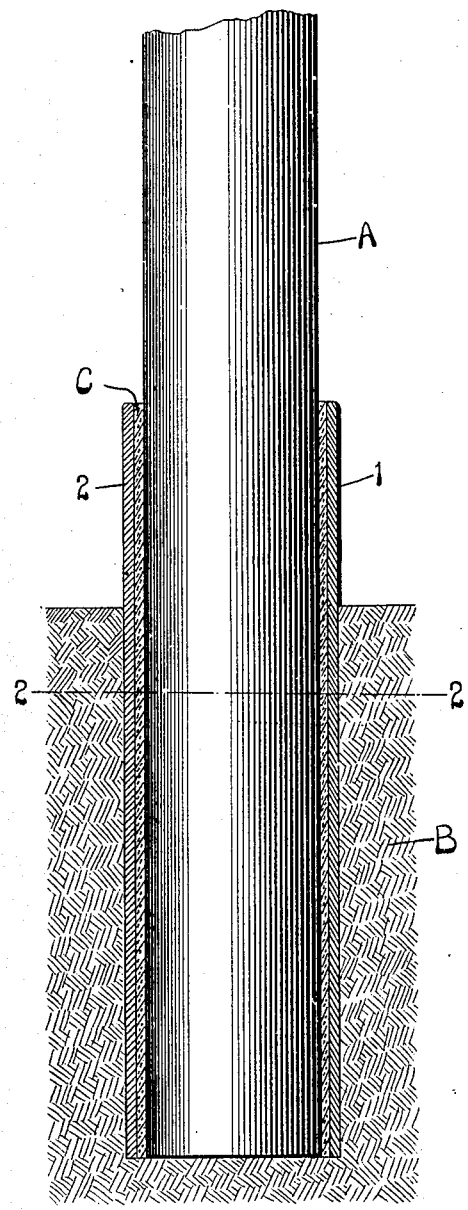
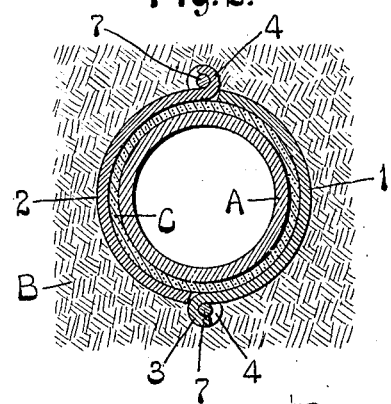
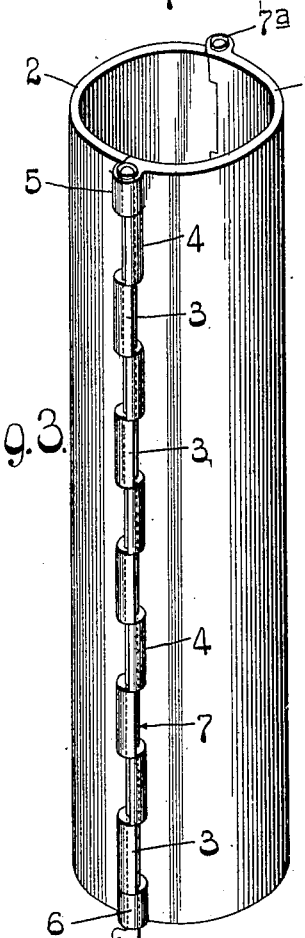
Witnesses
A. J. McCauley
Nells L. Church.
Inventor:
Charles G. Ette
by Bakewell & Cornwall Attys.

UNITED STATES PATENT OFFICE.

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

PROTECTING-SLEEVE FOR POSTS AND POLES.

No. 913,482.     Specification of Letters Patent.     Patented Feb. 23, 1909.

Application filed May 4, 1908. Serial No. 430,769.

*To all whom it may concern:*

Be it known that I, CHARLES G. ETTE, a citizen of the United States, residing at St. Louis, Missouri, have invented a certain new and useful Improvement in Protecting-Sleeves for Posts and Poles, of which the following is a full, clear, and exact description, such as will enable others skilled in the art to which it appertains to make and use the same, reference being had to the accompanying drawings, forming part of this specification, in which—

Figure 1 is a vertical sectional view of a protecting sleeve constructed in accordance with my invention arranged in operative position on a pole; Fig. 2 is a horizontal cross sectional view taken on the line 2—2 of Fig. 1; and Fig. 3 is a perspective view of my improved protecting sleeve.

This invention relates to devices that are used for protecting and strengthening the portions of post and poles, particularly metal poles, which are embedded in ground.

The main object of my invention is to provide a device for the purpose described which can be formed from cast metal and which presents a neat and ornamental appearance.

Referring to the drawings which illustrate the preferred form of my invention, 1 and 2 designate two semi-cylindrical-shaped sections that coöperate with each other to form a sleeve which can be slipped down over the lower end of a post or pole A that is embedded in the ground B so as to strengthen the post and prevent it from rusting or rotting away. Said sleeve is preferably of great enough diameter to permit some preserving substance C such, for example, as a composition containing sulfur, to be packed between the exterior of the pole and the interior of the sleeve, as shown in Fig. 1. This sleeve is adapted to be applied to posts that are in use; namely, posts that are embedded in the ground, and therefore it is necessary to form the sleeve in sections as herein shown so that it can be arranged in position.

The sections 1 and 2 are provided on their edges with coöperating semi-cylindrical-shaped flanges 3 and 4, respectively, and the flanges 3 on the section 1 are interposed between the flanges 4 on the section 2 and are disposed oppositely to said flanges, as shown in Fig. 3.

The section 1 is provided at one end with a pair of cylindrical-shaped lugs 5, and at the opposite end of the section 2 is a pair of cylindrical-shaped lugs 6. Fastening devices, preferably long rods 7, pass through these coöperating cylindrical-shaped lugs and semi-cylindrical-shaped flanges for connecting the sections 1 and 2 together. The rods 7 are provided at their upper ends with heads $7^a$ which rest on the lugs 5, and the lower ends of said rods are bent laterally at $7^b$, as shown in Fig. 3, after the rods have been placed in position, to prevent said rods from being pulled upwardly out of the coöperating lugs and flanges on said sections. It will be obvious, however, that nuts, keys, or any other suitable fastening devices could be used for preventing the rods 7 from being removed.

The sections 1 and 2 are formed of cast metal, preferably malleable iron, and the flanges 3 and 4 are so shaped that cores are not needed to form them in the casting operation, the only cores that are used in producing the device being those that form the openings in the cylindrical-shaped lugs 5 and 6.

Another advantage of a construction of this character is that one pattern can be used to form both of the sections 1 and 2, thus reducing the cost of manufacturing the device. Furthermore, it is not necessary to match the sections up in pairs for any two sections will coöperate with each other to produce a complete sleeve. Devices of this character are usually arranged in the position shown in Fig. 1, the upper portion of the device projecting above the ground line. Therefore, it is desirable that a device of this character should not have any sharp projections or flanges above the ground line that a person might trip on or that would catch and tear a person's clothes. My improved device is free from sharp projections that might cause damage as the lugs and flanges on the sections project only a slight distance from said sections and have no sharp corners.

My improved device is neat and ornamental and as it can be produced at a very low cost it forms a very desirable protecting sleeve for posts and poles that are embedded in the ground.

Having thus described my invention, what I claim as new and desire to secure by Letters Patent is:

1. A protecting sleeve for poles, consisting of two semi-circular-shaped members formed of cast metal and provided at certain intervals with integral semi-circular-shaped flanges that project laterally from the longitudinal edges of said members so as to receive longitudinally extending fastening devices, the flanges on one member being staggered relatively to the flanges on the other member and the flanges on both members being open at one side so that they can be cast without using cores; substantially as described.

2. A protecting sleeve for poles, consisting of two malleable iron sections that form a sleeve when they are placed together, integral open hook-shaped flanges on the longitudinal edges of said sections, the flanges on one section being arranged staggered relatively to the flanges on the other section and also in longitudinal alinement therewith, integral perforated lugs on the upper end of one section and on the lower end of the other section, and rods extending through said lugs and flanges to connect the sections together; substantially as described.

In testimony whereof I hereunto affix my signature in the presence of two witnesses, this twenty-ninth day of April 1908.

CHARLES G. ETTE.

Witnesses:
WALTER CLARENCE RAITHEL,
EDWARD SCHWIDDE.